UNITED STATES PATENT OFFICE.

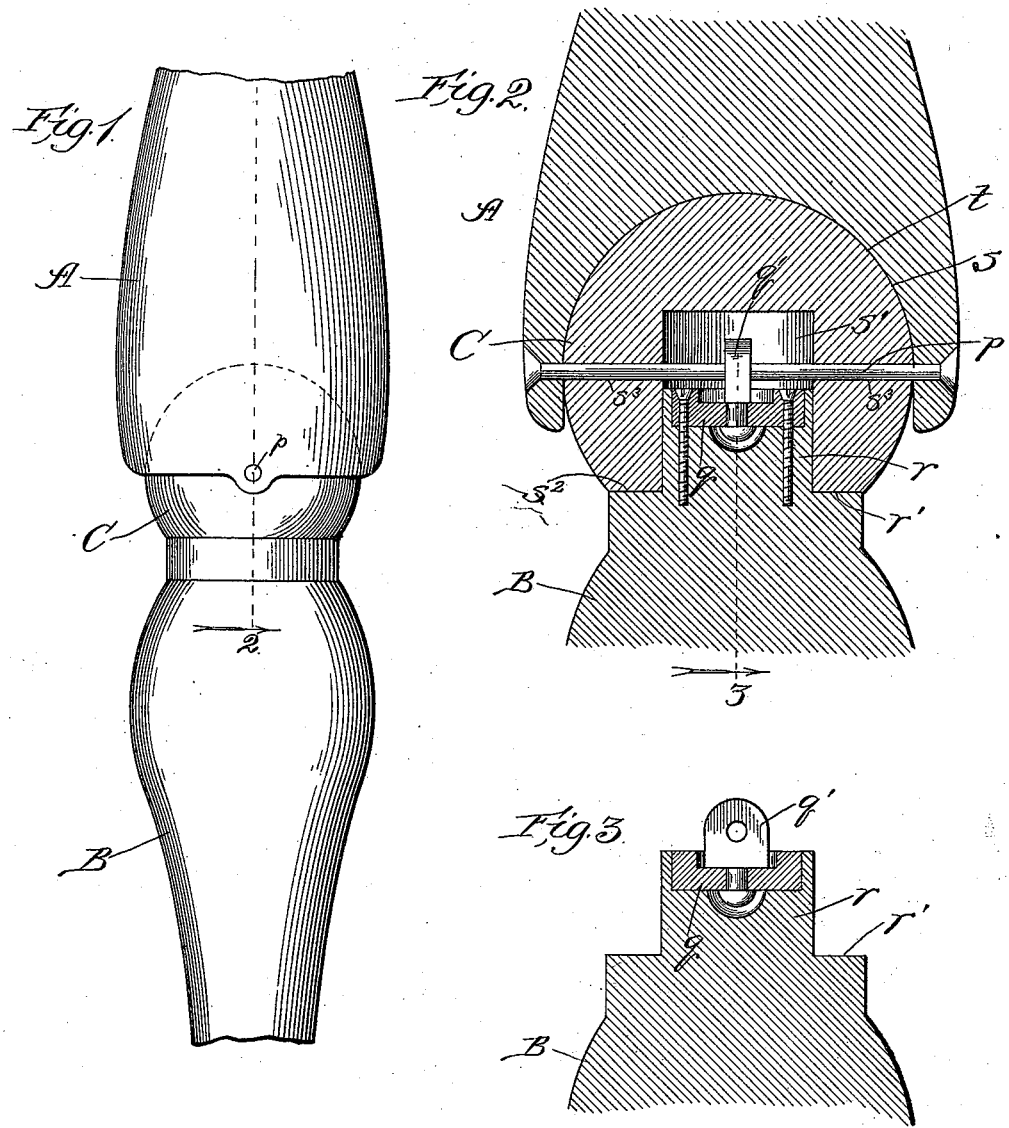

CHARLES FAUSEL, OF CHICAGO, ILLINOIS.

UNIVERSAL JOINT FOR DOLLS.

SPECIFICATION forming part of Letters Patent No. 553,643, dated January 28, 1896.

Application filed October 1, 1895. Serial No. 564,257. (No model.)

*To all whom it may concern:*

Be it known that I, CHARLES FAUSEL, a citizen of the United States, residing at Chicago, in the county of Cook and State of Illinois, have invented a new and useful Improvement in Joints, of which the following is a specification.

My invention relates to improvements in the construction of joints for use in securing together the limb members of dolls, display or lay figures, or in any connection where a supported object or member is to turn on its own axis and swing on its support.

My object is to provide a joint of the above class of improved construction, rendering it particularly strong, desirable, and simple.

In the drawings, Figure 1 is a broken elevation of a doll's arm, showing the connection at the elbow formed with my improved joint. Fig. 2 is an enlarged broken section taken on line 2 of Fig. 1, and Fig. 3 a broken section of the upper portion of the forearm or rotating member, the section being taken on line 3 of Fig. 2.

A is an upper arm-piece or joint member and B a forearm-piece or joint member. The member A is provided in its end with a concave rounded recess $t$ to receive a knuckle-piece or intermediate joint member, C, having a convex rounded surface $s$ conforming to the recess $t$, and the knuckle-piece is provided with a recess $s'$ to receive and fit loosely over a cylindrical projection $r$ on the end of the member B. On the member B, around the projection $r$, is an annular surface or shoulder $r'$, against which the member C fits at a bearing-surface $s^2$ about the recess $s'$. Countersunk in the end of the projection $r$ and firmly secured in place is a plate $q$, to which is swiveled an eyepiece $q'$. Extending across the recess $t$, and fastened at opposite ends in openings in the sides thereof, is a bolt $p$, and the parts fit together in a manner to permit the bolt to pass loosely through an opening $s^3$ in the knuckle-piece and through the eyepiece $q'$. Thus the knuckle-piece may swing with the member B upon the pivot afforded by the bolt $p$, and the swivel connection permits the member B to be rotated on the member C. The bolt $p$ affords the sole fastening means for securing the three members together. The parts should fit together in a manner sufficiently close to cause them to bear against each other with enough friction to remain with desired rigidity in any position to which they are relatively adjusted.

My improved construction renders the joint particularly strong and durable, and as all parts are connected together by means of the bolt $p$ alone the construction is particularly simple and desirable for dolls and display-figures.

My invention is not to be limited to use in any particular connection, as it may be found desirable in many cases where a supported member is to swing and rotate on its support.

What I claim as new, and desire to secure by Letters Patent, is—

1. In a joint, an intermediate member having a recess in one side, a member B provided at one end with a swivel-piece and extending at said end into the recess of the intermediate member, a member A fitting to the intermediate member, and a bolt passing through the member A and intermediate member, to hold them in pivotal relation, and through the swivel-piece to hold the member B in place to rotate upon the intermediate member, substantially as described.

2. In a joint, a member A provided in its end with a concave rounded recess $t$, a knuckle-piece C having, on one side, a convex rounded surface $s$, fitting the recess $t$, and at its opposite side a recess $s'$ and bearing surface $s^2$, a member B having a projection $r$ fitting into the recess $s'$ and a bearing-surface $r'$ fitting against the surface $s^2$, a swivel-piece fastened upon the projection $r$ and a bolt passing through the member A and knuckle-piece, to form the pivot of the knuckle-piece, and through the swivel-piece, to hold the member B at its surface $r'$ against the surface $s^2$ of the knuckle-piece, the bolt operating to secure the said members and knuckle-piece in operative relation, substantially as described.

CHARLES FAUSEL.

In presence of—
J. N. HANSON,
M. S. MACKENZIE.